(12) United States Patent
Zopf

(10) Patent No.: US 11,996,936 B2
(45) Date of Patent: May 28, 2024

(54) BIT ERROR CORRECTION FOR BLUETOOTH LOW ENERGY

(71) Applicant: Cypress Semiconductor Corporation, San Jose, CA (US)

(72) Inventor: Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/902,568

(22) Filed: Sep. 2, 2022

(65) Prior Publication Data

US 2023/0063442 A1 Mar. 2, 2023

Related U.S. Application Data

(63) Continuation of application No. 17/019,724, filed on Sep. 14, 2020, now Pat. No. 11,451,331.

(51) Int. Cl.
*H04L 1/00* (2006.01)
*H04L 1/08* (2006.01)
*H04L 45/74* (2022.01)

(52) U.S. Cl.
CPC .............. *H04L 1/0045* (2013.01); *H04L 1/08* (2013.01); *H04L 45/74* (2013.01)

(58) Field of Classification Search
CPC ......... H04L 1/0045; H04L 1/08; H04L 45/74; H04L 1/0061; H04L 1/1825; H04L 1/1845; H04L 1/0008; H04W 28/04
See application file for complete search history.

(56) References Cited

U.S. PATENT DOCUMENTS

2021/0143940 A1* 5/2021 Linsky ................. H04L 1/1678
2021/0385162 A1* 12/2021 Li .......................... H04L 69/22

* cited by examiner

*Primary Examiner* — Thien Nguyen

(57) ABSTRACT

Disclosed are methods and systems for a Bluetooth Low Energy (BLE) receiver to reduce the number of retransmission of packets needed to receive an error free packet so as to improve channel throughput. Techniques to reduce the number of retransmissions include a combination of processing of the header of the received packets to increase the number of corrupted packets available for reconstructing the original payload and bit error correction (BEC) of the payload of the corrupted packets. Header processing may include making available for payload reconstruction a packet whose received access address differs by no more than 1-bit from an assigned address of the receiver provided at least one of the corrupted packets used in the reconstruction contains an error-free access address. Header processing may also include using a prior error-free decoded length of the packet to aid in the determination of the length field of a current packet.

20 Claims, 12 Drawing Sheets

BIT ERROR CORRECTION FOR BLUETOOTH LOW ENERGY

RELATED APPLICATIONS

This application is a continuation application of U.S. Non-Provisional patent application Ser. No. 17/019,724, filed Sep. 14, 2020, the entire contents of which are incorporated herein by this reference.

TECHNICAL FIELD

The subject technology generally relates to wireless communication systems, and more particularly, to systems and methods for correcting bit errors in wireless communication systems such as a Bluetooth® network.

BACKGROUND

Bit errors are a hallmark of wireless communication links. Bit errors may be broadly categorized as random errors or burst errors. Random bit errors are evenly distributed across transmission packets in time and may be caused by a persistent channel impairment, such as a weak signal due to physical barriers or a long distance link. Bursty bit errors are localized in time and may be caused by a transient condition such as an interfering transmission or intermittent channel congestion. Many wireless communication systems or protocols, such as Bluetooth Low Energy (BLE), use retransmissions to achieve a reliable communication link between a transmitter and a receiver. Such systems conventionally discard corrupted transmissions and rely on error-free reception of a subsequent retransmission. It is assumed that retransmission may combat low levels of random bit errors, (i.e., an error-free packet is received after some reasonable number of retransmission).

However, the likelihood of receiving an error-free packet quickly drops with increasing packet size and bit error rate (BER), resulting in a significant increase in the number of retransmissions. Several retransmissions may be necessary to overcome even low random BER. For example, with a 253-byte packet (maximum allowable in BLE), significant retransmissions are required beyond 0.01% BER, and the system fails beyond 0.10% BER. The number of retransmissions may have a negative impact on delay and power requirements. In addition, real-time or two-way audio or video wireless links are delay sensitive and may limit the number of retransmissions. In applications that are less delay sensitive such as streaming, a buffer that is larger than the length of the expected duration of poor transient channel conditions may be used to overcome burst errors and a large number of retransmission. Such large buffers also incur complexity, size and power penalties.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
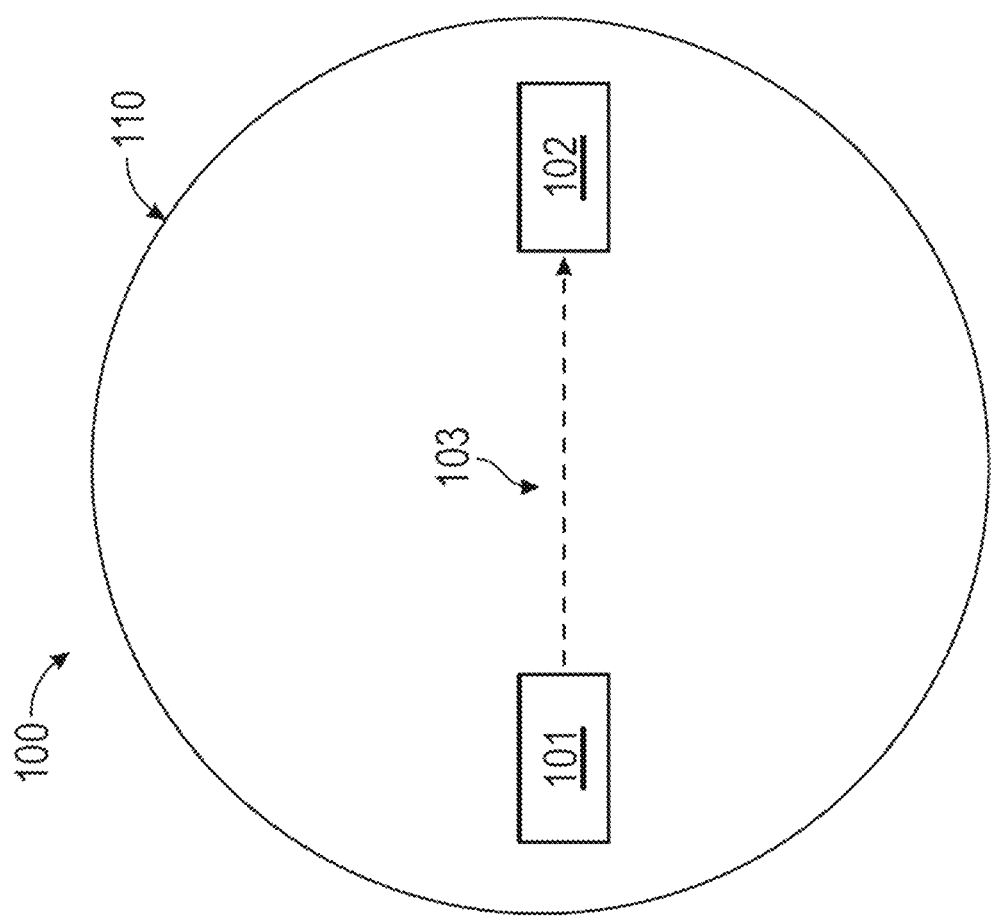
FIG. 1 illustrates an example wireless network architecture, in accordance with some embodiments of the present disclosure.

Examples of various aspects and variations of the subject technology are described herein and illustrated in the accompanying drawings. The following description is not intended to limit the invention to these embodiments, but rather to enable a person skilled in the art to make and use this invention.

Bluetooth Low Energy (BLE), like most wireless communication systems/protocols, uses retransmission to achieve a reliable communication link. When a corrupted packet is received such as when the packet fails the cyclic redundancy check (CRC) or when a corrupted header does not match the destination address of a receiver, the receiver may request the source of the packet to retransmit the packet. As the packet size or the bit error rate (BER) increases, the number of retransmissions required to receive an error-free packet may increase significantly. Aspects of the subject technology disclosed herein reduce the number of retransmissions needed to reconstruct an error-free packet, thereby improving channel throughput, increasing communication range, and reducing latency and power consumption. While aspects of the subject technology are described in the context of BLE, it is understood that the subject technology is applicable to other wireless networks including but not limited to cellular networks (e.g., Long-Term Evolution (LTE) networks), wireless local area networks (WLANs), wireless sensor networks and satellite communication networks.

In one embodiment, techniques to reduce the number of retransmissions may include a combination of processing of the header of received packets to increase the number of corrupted packets available for reconstructing the original payload and bit error correction (BEC) of the payload of the corrupted packets. In one embodiment, header processing may include making available for payload reconstruction a packet whose received access address differs by no more than 1-bit from an assigned address of the receiver. Thus, packets that have only one corrupted bit in the access address may still be used to contribute to an error-free reconstruction of the payload. A packet may be deemed corrected when the reconstructed payload passes the CRC and at least one of the corrupted packets used in the reconstruction contains an error-free access address.

In one embodiment, header processing may include using a prior error-free decoded length of the packet to aid in the determination of the length field of a current packet. The technique may correct a currently decoded length field of the header of a received packet to be equal to a previously correctly decoded length if the currently decoded length differs from the previously correctly decoded length by a single bit. The technique may use the corrected length field to receive the rest of the packet, increasing the likelihood of correct length decoding and increasing the number of packets correctly received. For example, if the received payload including the corrected length field passes the CRC, then there was a bit error in the decoded length field and it has been corrected. In one embodiment, even if the payload received using the corrected length field does not initially pass the CRC, the corrupted packet may still be used to reconstruct the original payload using BEC techniques.

In one embodiment, reconstructing the payload using the BEC techniques may include combining corrupted packets at the bit level to create an accumulated soft bit packet to increase the likelihood of correctly resolving bit errors as the number of retransmissions increases. The technique, referred to as retransmission-BEC (RE-BEC), may generate a majority decision packet based on the accumulated soft bit packet to generate a best guess of the payload. The technique may compute CRC on the majority decision packet to verify if all errors have been resolved.

In one embodiment, a BEC technique known as CRC error correction (CRC-EC) may be used after RE-BEC in case of continued CRC failure. The CRC-EC technique may evaluate the accumulated soft bit packet from the RE-BEC to identify likely bit-error positions. The CRC-EC technique may permutate through possible combinations of bit-error positions to flip the error bits and to check the CRC result to identify an error-free combination. For example, the technique may generate a CRC checksum on the RE-BEC created majority decision packet as a reference error syndrome. The technique may generate combined error syndromes associated with the permutations of bit-error positions for comparison with the reference error syndrome. If the combined error syndromes associated with a combination of bit-error positions match the reference error syndrome, the flipped bit associated with the bit-error positions provide the bit error correction.

FIG. 1 illustrates an example network architecture 100, in accordance with some embodiments of the present disclosure. As shown in FIG. 1, the network architecture 100 may include a transmitter 101 and a receiver 102. The transmitter 101 may transmit wireless radio-frequency signals carrying data packets (or data messages, frames, etc.) to the receiver 102, as indicated by arrow 103. The receiver 102 may receive the transmitted signals to extract the data packets. If the receiver 102 detects that a transmitted data packet is correctly received without bit errors, the receiver 102 may send a notification such as an acknowledgement (ACK) to the transmitter 101. The transmitter 101 will not retransmit the correctly received data packet. On the other hand, if the receiver 102 detects that a received data packet is a corrupted data packet including one or more bit errors, the receiver 102 may send a notification such as a negative acknowledgement (NACK) to the transmitter 101. The transmitter 101 will retransmit the data packet to the receiver 102. The circle 110 illustrated in FIG. 1 may represent the range of the radio-frequency signals transmitted by the transmitter 101. Receivers such as the receiver 102 that are located within the circle 110 may be able to receive radio-frequency signals transmitted by the transmitter 101.

In one embodiment, the network architecture 100 may be a Bluetooth® network. A Bluetooth® network may be a wireless network that includes network devices which communicate using radio frequencies, protocols, standards, data formats, etc., that have been defined by the Bluetooth® Special Interest Group (Bluetooth® SIG). In this embodiment, the transmitter 101 may be a Bluetooth® transmitter and the receiver 102 may be a Bluetooth® receiver. The data packets transmitted from the transmitter 101 to the receiver 102 may be Bluetooth® packets. In some embodiments, the Bluetooth® network (e.g., the devices within the Bluetooth® network) may use the Bluetooth® Low Energy (BLE) standard. The network architecture 100 may also include other nodes, components and/or devices not shown in FIG. 1.

In order to use a small number (e.g., 2-3) of retransmissions to receive an error-free packet and provide significant power and delay savings and low complexity, the receiver 102 may not discard corrupted received packets because multiple corrupted received packets of the same transmitted packet may provide useful information to determine the locations of bit errors in the corrupted received packets. The receiver 102 may combine the corrupted received packets to reconstruct the original packet using BEC techniques including RE-BEC and CRC-EC. The receiver may process the header of the received packets including the access address and the length field to increase the number of corrupted packets available for reconstructing the original packet using the BEC techniques.

Figure 2:
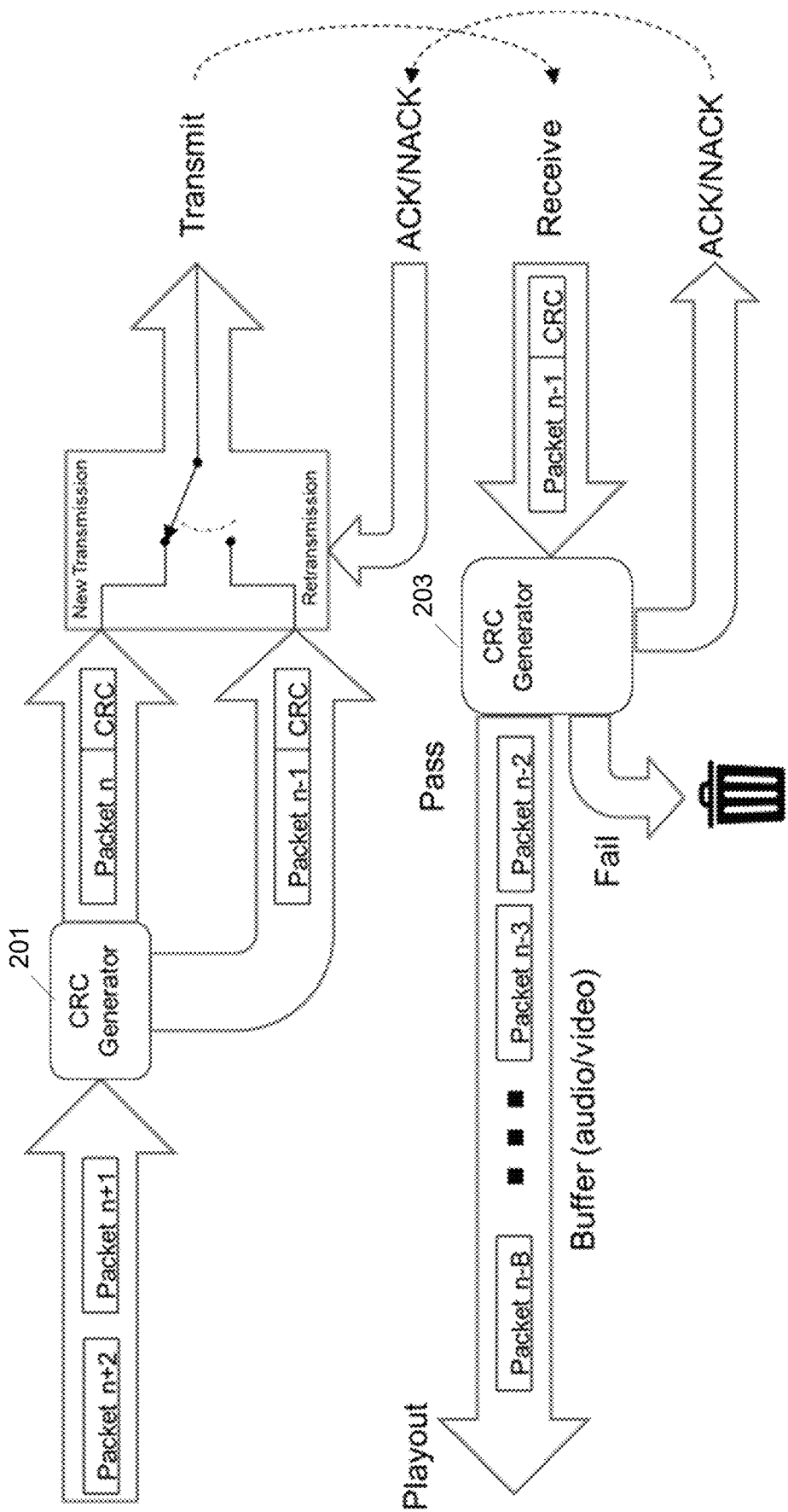
FIG. 2 illustrates an example of a standard scheme for retransmission and buffering to combat bit errors.

FIG. 2 illustrates an example of a standard scheme for retransmission and buffering to combat bit errors. A CRC generator 201 on the transmitter may compute the CRC checksum for the payload of each packet to be transmitted. The computed CRC checksum may be appended to the payload to form a packet that conforms to the data format of a wireless network and the transmitter may transmit the packet over a channel of the wireless network to a receiver. The packet may be corrupted by random bit errors due to persistent channel impairment or bursty bit errors caused by a transient interfering source or intermittent channel congestion.

A CRC generator 203 on the receiver may receive the packet and may extract the payload to compute the CRC checksum. If the computed CRC checksum matches the received CRC checksum of the packet, the received packet was received without any errors and the receiver may transmit the ACK signal to the transmitter. Otherwise, if the computed CRC checksum does not match the received CRC checksum, the packet was corrupted and the receiver may transmit the NACK signal to the transmitter to request retransmission of the packet. In one aspect, the CRC generator 203 on the receiver may compute the CRC checksum, also referred to as error syndrome, on the packet including the received CRC checksum. If the computed CRC checksum is zero, the received packet including the received CRC checksum has no errors. Otherwise, the packet has errors. It is assumed that retransmission can combat low levels of random bit errors (an error-free packet is received after some reasonable number of retransmissions). Buffering is introduced to combat bursty bit errors by building in enough delay to handle the length of the expected duration of poor transient channel conditions. A large number of retransmissions and a large buffer adversely affect network throughput, power, latency, cost, etc. Techniques are presented to reduce the number of retransmissions needed to reconstruct an error-free packet, thus improving channel throughput, increasing communication range, and reducing latency and power consumption.

Figure 3:
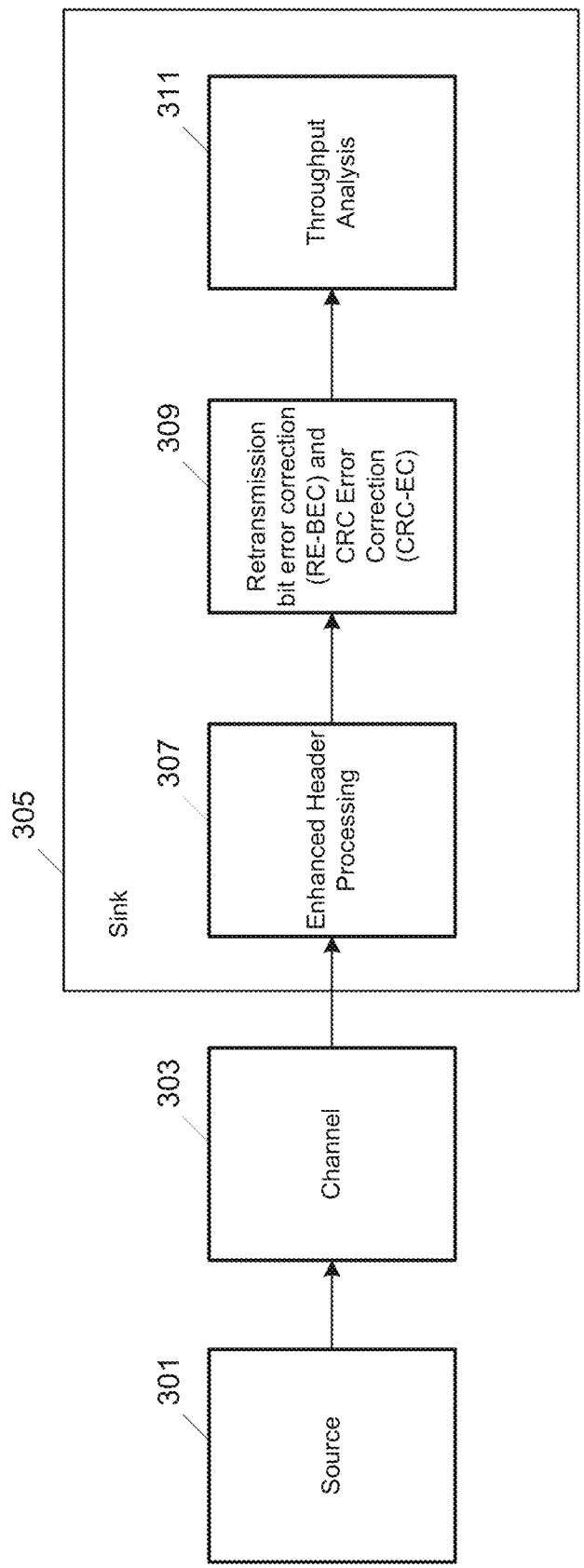
FIG. 3 illustrates an example model for evaluating the performance of header decoding and bit error correction techniques to reduce the number of retransmission, in accordance with some embodiments of the present disclosure.

FIG. 3 illustrates an example model for evaluating the performance of header decoding and bit error correction techniques to reduce the number of retransmission, in accordance with some embodiments of the present disclosure. A source 301 such as the Bluetooth® transmitter 101 of FIG. 1 provides BLE packets including retransmission of corrupted packets through a channel 303. The channel 303 may be modeled as an additive white Gaussian noise (AWGN) channel with BER corresponding to various attenuation scenarios.

A sink 305 such as the Bluetooth® receiver 102 processes corrupted packets and their retransmission to reconstruct an original error-free packet. Receiver processing of the sink 305 includes a combination of an enhanced header processing module 307 that increases the number of corrupted packets available for reconstructing the original packet and a RE-BEC and CRC-EC module 309 that uses BEC techniques to reconstruct a payload of the original packet.

In one aspect, header processing module 307 may make available for payload reconstruction a corrupted packet whose received access address differs by no more than 1-bit from an assigned access address of the sink 305. The RE-BEC and CRC-EC module 309 may attempt to reconstruct the payload when at least one of the corrupted packets used in the reconstruction contains an error-free access address. In one aspect, header processing module 307 may correct the decoded length field of the header of a currently received packet to be equal to a previously correctly decoded length if the currently decoded length differs from the previously correctly decoded length by a single bit. The sink 307 may use the corrected length field to receive the rest of the packet, increasing the likelihood of correct length decoding and thus the number of packets correctly received, or increasing the number of corrupted packets available for payload reconstruction by the RE-BEC and CRC-EC module 309.

In one aspect, the RE-BEC technique of the RE-BEC and CRC-EC module 309 combines the corrupted packets (e.g., corrupted payloads) at the bit level to create an accumulated soft bit packet to increase the likelihood of correctly resolving bit errors as the number of retransmissions increases. A CRC is computed on a hard decision packet derived from the accumulated soft bit packet to verify if all errors have been resolved correctly. In one aspect, the CRC-EC technique is used after RE-BEC in the case of continued CRC failure. CRC-EC is a bit flipping technique that uses knowledge of potential bit error positions and the properties of CRC computation to permutate quickly through bit error combinations to provide bit error correction. The RE-BEC and CRC-EC techniques are extremely low complexity and may be implemented in firmware or incorporated into modem hardware. A throughput analysis module 311 may analyze the number of retransmissions needed to reconstruct an error-free packet (an error-free packet may be interpreted as an error-free payload) to determine the throughput improvement achieved by the enhanced header processing and the BEC techniques.

Figure 4:
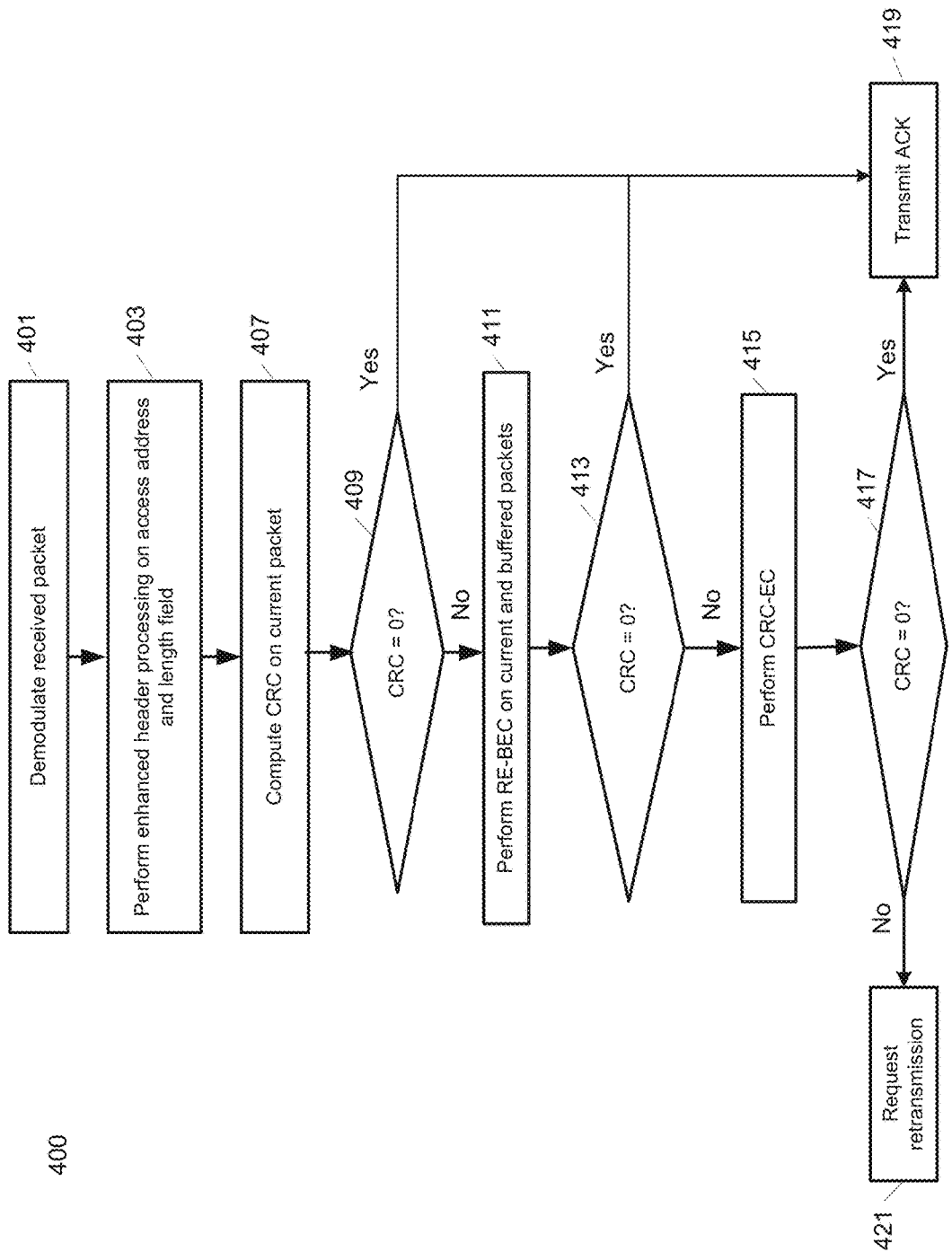
FIG. 4 illustrates a flow diagram of a method for header processing to reduce the header error rate and bit error correction (BEC) processing including using the retransmission-BEC (RE-BEC) and CRC error correction (CRC-EC) techniques to correct bit errors in the payload of corrupted packets, in accordance with some embodiments of the present disclosure.

FIG. 4 illustrates a flow diagram of a method 400 for header processing to reduce the header error rate and BEC processing including using the RE-BEC and CRC-EC techniques to correct bit errors in the payload of corrupted packets, in accordance with some embodiments of the present disclosure. Method 400 may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the receiver 102, or a processing device included in the receiver 102 (e.g., processing device 1211 illustrated in FIG. 12).

At block 401, the method 400 demodulates a packet received from a transmitter. When the received packet is a BLE packet, it may contain an access address field indicating the address of the receiver for which the packet is intended and a protocol data unit (PDU) encapsulating a header and a payload of the packet. The header may contain a length field indicating the length of the PDU.

Figure 5:
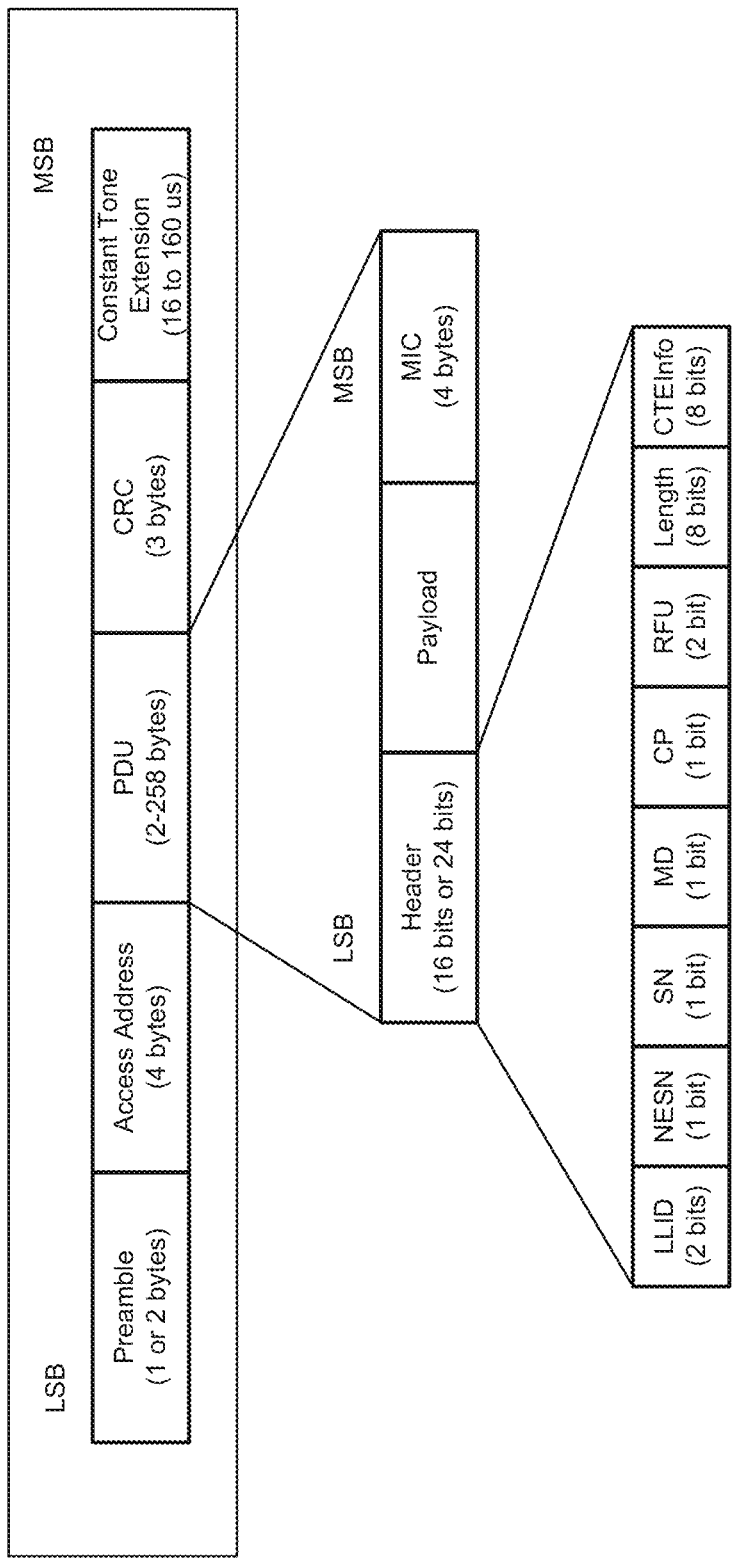
FIG. 5 illustrates the format of a Bluetooth Low Energy (BLE) uncoded data packet including the access address and the length field of the header of the protocol data unit (PDU), in accordance with some embodiments of the present disclosure.

FIG. 5 illustrates the format of a BLE uncoded data packet including a preamble, the access address, the PDU, and the CRC checksum in accordance with some embodiments of the present disclosure. The access address is 4 bytes long. A link layer of the transmitter may generate a new access address for each initiating PDU it transmits. It is intended that each connection between two devices has a different access address. The access address for a device must differ by more than one bit from any other access address being used. The received access address must also match that assigned to the device for the PDU to be used by the device.

The PDU may be between 2 and 258 bytes long and includes the 2 or 3-byte header and the payload. The header includes the one-byte length field that indicates the length of the PDU. The receiver device may use the length field to receive the PDU of the correct length. A 3-byte CRC checksum may be computed on the received PDU including the length field for comparison with the received CRC to verify if the PDU has been correctly received.

Referring back to FIG. 4, at block 403, the method 400 performs enhanced header processing on the access address and the length field received in the packet. The access address and the length field may be corrupted by bit errors just like the payload. Furthermore, the access address is not protected (e.g., unencoded by the transmitter). For example, with a BER=0.005, there is a 15% probability of at least one bit-error in the 4-byte access address. These are packets that might have otherwise been correct, or have been able to contribute to resolving an error free PDU. An error in the length field may also significantly hinder the ability to correct packets. For example, an error in the PDU occurring only in the length field would cause an incorrect amount of data to be received and subsequent incorrect computation of the CRC check. The enhanced header processing may reduce the bit error rate on the access address or the length field to increase the number of corrupted packets available for subsequent processing.

In one aspect, the enhanced header processing may make available for payload reconstruction a corrupted packet whose received access address differs by no more than 1-bit from an assigned access address of the receiver. To maximize error correction potential while still conforming to the BLE specification, a packet may be deemed corrected through a series of retransmissions when the CRC passes and at least one of the corrupted packets used in the reconstruction contained an error-free access address.

In one aspect, during link setup, the maximum length PDU (up to the maximum defined allowed) may be set and exchanged between the transmitter and the receiver. The throughput is generally maximized when the data contained in the PDU is also maximized. Hence, this would suggest during poor channel conditions to use prior error-free decoded length field to aid in the determination of the current length field. Since the length field is only 8 bits, the probability of the length field containing more than one error-bit is low, even in very poor channel conditions. At the same time, if the current decoded length field differs by a single bit compared to the previously correctly decoded length field, it is highly likely that there is a bit error. Thus, the enhanced header processing of block 403 may correct the current decoded length field of the received packet to be equal to the previously correctly decoded length field if the current decoded length field differs from the previously correctly decoded length field by a single bit. The method may use the corrected length field to receive the rest of the packet, increasing the likelihood of passing the CRC check, or otherwise increasing the number of corrupted packets available for payload reconstruction. Further details of the enhanced header processing will be discussed with regard to FIGS. 6 and 7.

In block 407, the method 400 computes the CRC checksum of the PDU of the current received packet. In block 409, the method 400 checks to see if the CRC checksum is zero. If the CRC checksum is zero, indicating that the PDU has been received error-free, the method 400 transmits an ACK signal at block 419. Otherwise, if the CRC fails, the method performs RE-BEC on the current and previously buffered corrupted original and retransmitted packets, if any, to reconstruct the payload at block 411.

The RE-BEC technique combines the payloads of the corrupted packets at the bit level to create an accumulated soft bit packet to increase the likelihood of correctly resolving bit errors as the number of retransmissions increases. From the accumulated soft bit packet, a majority decision packet (MDP) may be created. Each bit may be set by a majority voting scheme. A tie in the number of received 0's and 1's may be resolved by an arbitrary bit setting. Assuming the BER is independent of bit position, the probability that a bit-error falls in the same location is exceedingly small and decreases with each retransmission. Hence, the ability to resolve errors increases with an increasing number of retransmissions. The RE-BEC technique computes a CRC on the MDP to verify if all errors have been resolved correctly. At block 413, if the CRC checksum is zero, indicating that the reconstructed payload is error-free, the method 400 transmits an ACK signal at block 419. Further details of the RE-BEC technique will be discussed with regard to FIG. 8.

At block 415, if the CRC fails after the RE-BEC, the method 400 performs the CRC-EC technique. The CRC-EC technique may generate permutations of possible bit error positions to identify the error free combination. In one aspect, the 24-bit non-zero CRC checksum from the RE-BEC created MDP in block 413 is obtained as a reference error syndrome. The high risk or most likely bit-error positions are identified from the accumulated soft bit packet created by the RE-BEC from block 411. The bits associated with the permutations of the likely bit-error positions may be flipped. The CRC-EC technique may generate combined error syndromes associated with the permutations of the likely bit-error positions for comparison with the reference error syndrome.

At block 417, the combined error syndromes associated with permutation of the likely bit-error positions are compared with the reference error syndrome. If the combined error syndrome associated with a combination of likely bit-error positions matches the reference error syndrome, the flipped bits associated with that combination of likely bit-error positions successfully reconstruct an error-free payload and the method 400 transmits an ACK signal at block 419. Otherwise, if the combined error syndromes associated with all permutations of the likely bit-error positions do not match the reference error syndrome, the CRC-EC technique fails to correct the bit errors and the method 400 transmits a NACK signal at block 421. Further details of the CRC-EC technique will be discussed with regard to FIG. 9.

Figure 6:
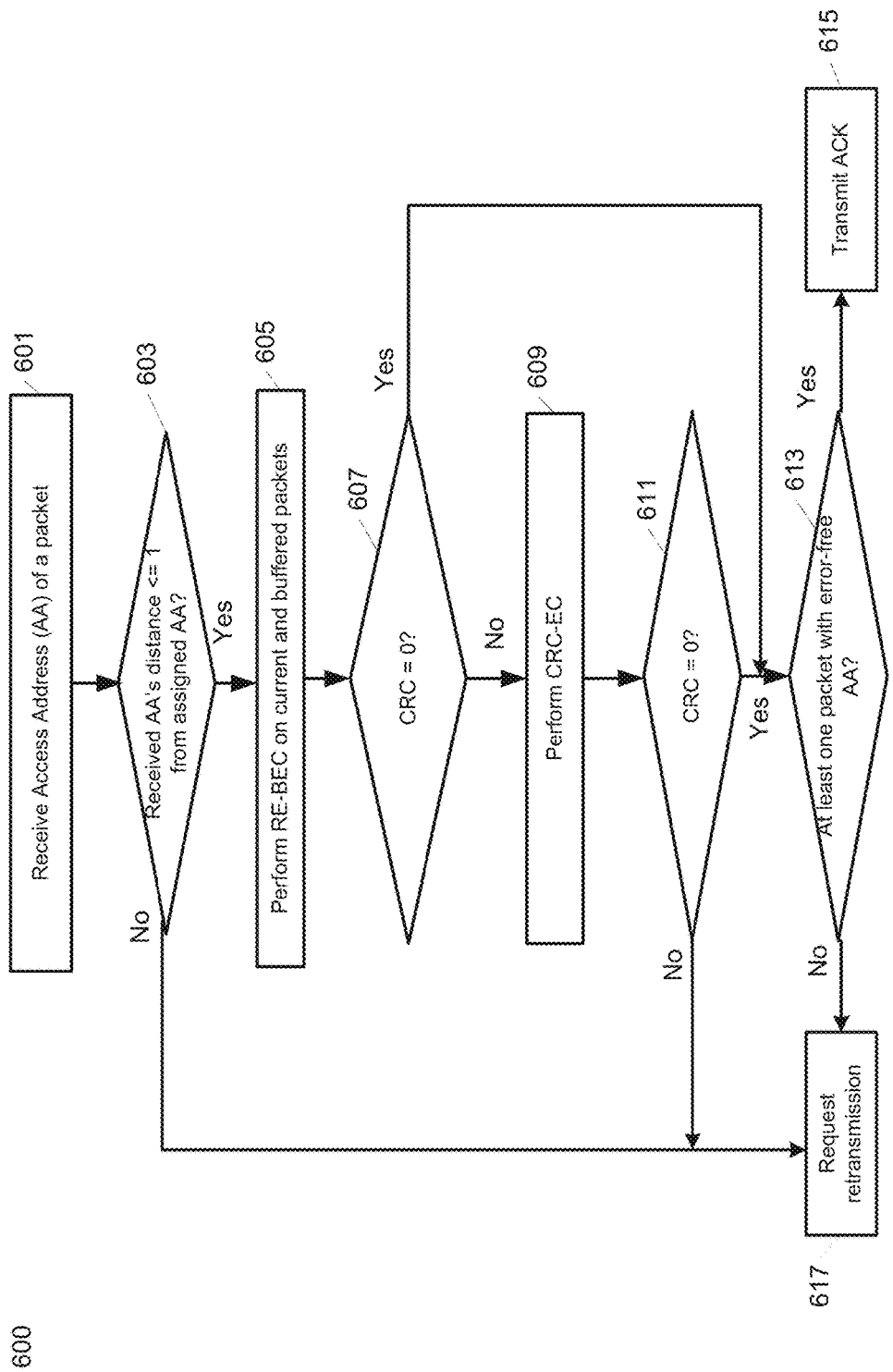
FIG. 6 illustrates a flow diagram of a method to process the access address of a corrupted BLE packet to increase the number of corrupted packets available for bit error correction using the RE-BEC and CRC-EC techniques, in accordance with some embodiments of the present disclosure.

FIG. 6 illustrates a flow diagram of a method 600 to process the access address of a corrupted BLE packet to increase the number of corrupted packets available for bit error correction using the RE-BEC and CRC-EC techniques, in accordance with some embodiments of the present disclosure. Method 600 may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the receiver 102, or a processing device included in the receiver 102 (e.g., processing device 1211 illustrated in FIG. 12).

At block 601, the method 600 receives the access address that identifies the recipient of a packet. The standard requires the received access address to match that assigned to a device for the packet to be used by the device. This requirement limits the packet recovery potential of an error correction technique because the access address is unprotected and is 4 bytes in length. For example, with a BER=0.005, there is a 15% probability of at least one bit-error in the 4-byte access address. These are packets that might have otherwise been correct, or have been able to contribute to resolving an error free PDU.

At block 603, the method 600 determines if the received access address differs by no more than one bit from the assigned access address. The access address assigned to a device must differ by more than one bit from any other access address being used. Thus, if the received access address differs by more than one bit from the assigned access address, the packet is most likely intended for another device and the packet may be discarded. The method 600 may request retransmission at block 617.

If the received access address differs by one bit from the assigned access address or matches exactly with the assigned access address, the method 600 receives the PDU of the packet and makes the PDU available for payload reconstruction using the BEC techniques. At block 605, the method 600 performs RE-BEC to reconstruct the payload based on the received PDU along with any other previously buffered PDUs associated with packets whose received access addresses differ by no more than one bit from the assigned access address.

At block 607, the method 600 determines if the CRC of the PDU reconstructed by the RE-BEC technique passes the CRC check. If the CRC is zero indicating the reconstructed PDU is error-free, the method 600 determines if at least one of the packets used for payload reconstruction by the RE-BEC technique has an error-free access address at block 613. Verifying that there is at least one packet with error-free access address allows the method 600 to pass any access address-related conformance testing while maximizing the error correction potential. If this verification is successful, the method 600 transmits an ACK signal at block 615. If this verification is not successful, the method requests retransmission at block 617.

If at block 607, the CRC of the PDU reconstructed by the RE-BEC technique is not zero, the method 600 invokes the CRC-EC technique at block 609 to perform further bit correction. At 611, the method 600 determines if the CRC of the PDU reconstructed by the CRC-EC technique passes the CRC. If the CRC is not zero, the payload reconstructed using the RE-BEC and CRC-EC techniques is still not error-free and the method 600 requests retransmission at block 617. If the CRC is zero, the method 600 determines if at least one of the packets used for payload reconstruction by the RE-BEC and CRC-EC techniques has an error-free access address at block 613. If this verification is successful, the method 600 transmits an ACK signal at block 615. If this verification is not successful, the method 600 requests retransmission at block 617.

Figure 7:
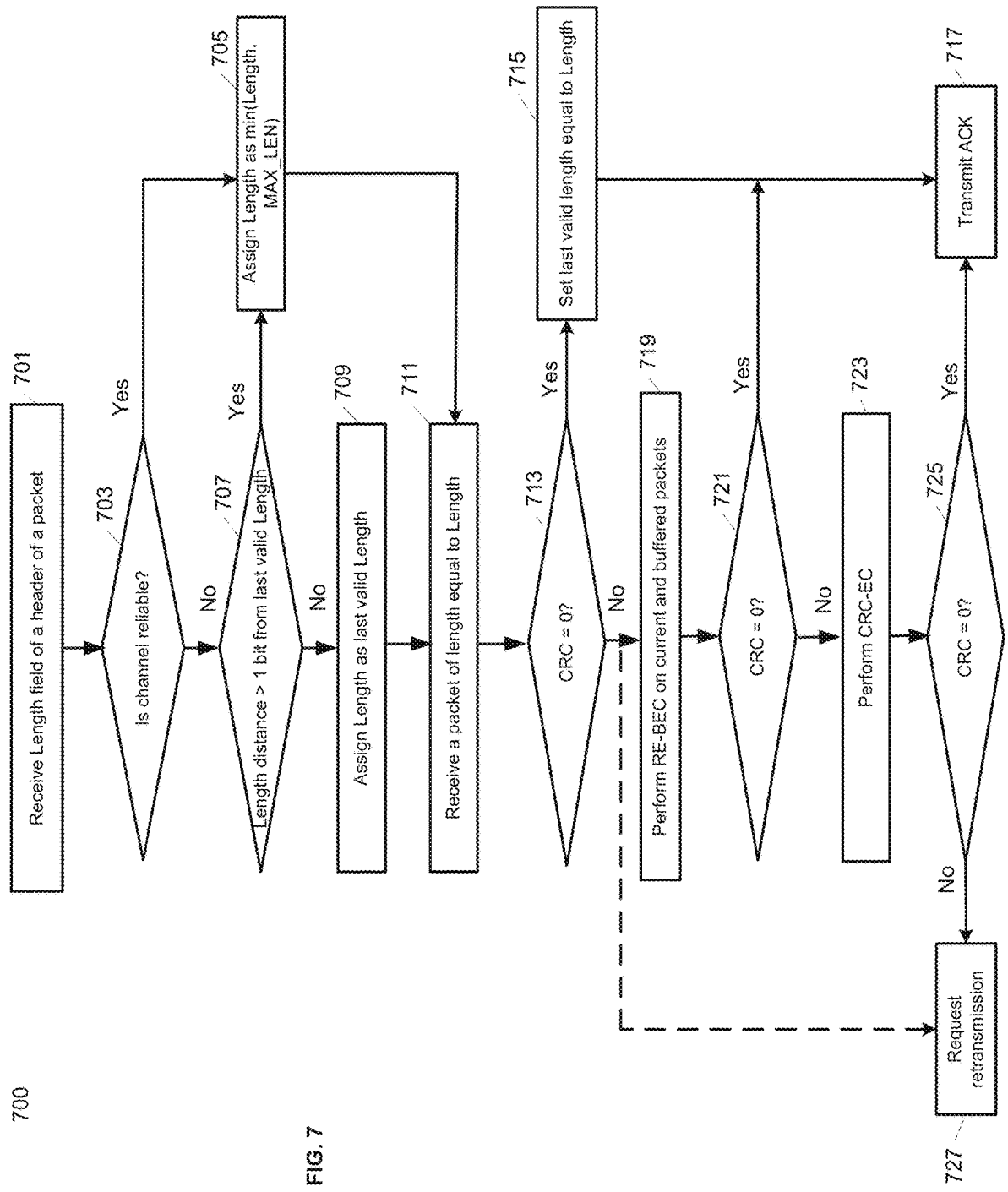
FIG. 7 illustrates a flow diagram of a method to correct the length field of a corrupted BLE packet to increase the number of corrupted packets available for bit error correction using the RE-BEC and CRC-EC techniques, in accordance with some embodiments of the present disclosure.

FIG. 7 illustrates a flow diagram of a method 700 to correct the length field of a corrupted BLE packet to increase the number of corrupted packets available for bit error correction using the RE-BEC and CRC-EC techniques, in accordance with some embodiments of the present disclosure. Method 700 may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the receiver 102, or a processing device included in the receiver 102 (e.g., processing device 1211 illustrated in FIG. 12).

At block 701, the method 700 receives the one-byte length field in the header of the packet that indicates the length of the PDU. Because the CRC checksum of the packet is computed over the PDU including the length field, the reliability of the length field is not known until CRC is computed after data reception. Thus, an error in the PDU occurring only in the length field may cause an incorrect amount of data of the PDU to be received and subsequent incorrect computation of the CRC checksum.

At block 703, the method 700 determines if the channel is reliable. In one aspect, the method 700 may determine whether the channel is reliable based on the statistics of the corrupted packets or the number of retransmissions needed to receive or to reconstruct error-free packets. If the channel is deemed reliable, the method 700 assigns the length of the PDU as the minimum of the received length field and the maximum allowed length at block 705. The maximum allowed length of the PDU is normally defined through an exchange between the receiver and the transmitter during a link setup. The throughput is generally maximized when the data contained in the PDU is also maximized. The method 700 proceeds to receive the packet including the PDU based on the assigned length.

On the other hand, if the channel is deemed unreliable, this would suggest using prior error-free decoded length field to aid in the determination of the current length field. Since the length field is only 8 bits, the probability of the length field containing more than one error-bit is low, even in very poor channel conditions. At the same time, if the current decoded length field differs by a single bit compared to a previously correctly decoded length field, it is highly likely that there is a bit error. At block 707, the method 700 determines if the current decoded length field differs by more than a single bit from a last valid length field. If this condition is true, the current decoded length field is passed as is to block 705 to be used as the assigned length to receive the packet.

At block 709, if the current decoded length field differs by no more than a single bit from a last valid length field, the method 700 assigns the current length as the last valid length field based on the high likelihood that the last valid length field is also transmitted as the length field for the current packet but that it has been corrupted by a bit error. Thus, the method 700 corrects the current decoded length field to be equal to the last valid length field. At block 711, the method receives the packet including the PDU based on the corrected length.

At block 713, the method 700 determines if the CRC of the PDU received using the assigned length passes the CRC check. If the CRC is zero indicating that the PDU is error-free, the method 700 sets the last valid length field as the currently assigned length at block 715. The currently assigned length may have been corrected by block 709 or may be what was received unchanged through block 705. The method 700 then transmits an ACK signal at block 717.

If the CRC is not zero, the method 700 performs RE-BEC to reconstruct the payload based on the received PDU along with any other previously buffered PDUs at block 719. In one aspect, if the CRC is not zero and the currently assigned length was corrected by block 709, the method 700 may request retransmission at block 727 to bypass reconstruction of the payload using BEC techniques.

At 721, the method 700 determines if the CRC of the PDU reconstructed by the RE-BEC technique passes the CRC check. If the CRC is zero indicating the reconstructed PDU is error-free, the method transmits an ACK signal at block 717. If the CRC of the PDU reconstructed by the RE-BEC technique is not zero, the method 700 invokes the CRC-EC technique at block 723 to perform further bit correction. At 725, the method 723 determines if the CRC of the PDU reconstructed by the CRC-EC technique passes the CRC. If the CRC is not zero, the payload reconstructed using the RE-BEC and CRC-EC techniques is still not error-free and the method 700 requests retransmission at block 727. Otherwise, the method transmits an ACK signal at block 717.

Figure 8:
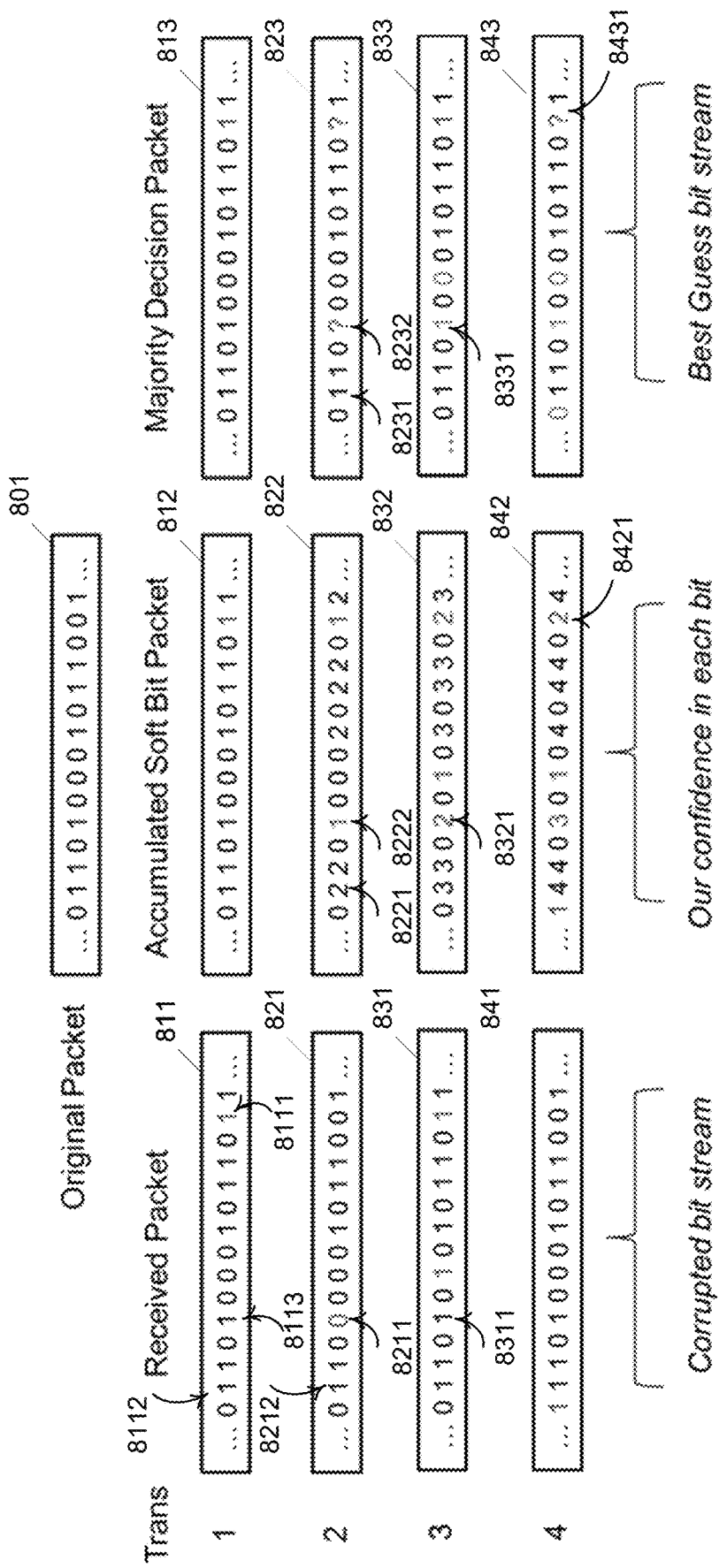
FIG. 8 illustrates an example generation of accumulated soft bit packets and creation of a majority decision packet using the RE-BEC technique operating on corrupted packets, in accordance with some embodiments of the present disclosure.

FIG. 8 illustrates an example generation of accumulated soft bit packets and creation of a majority decision packet using the RE-BEC technique operating on corrupted packets, in accordance with some embodiments of the present disclosure. A transmitter such as the transmitter 101 of FIG. 1 can transmit radio frequency signals carrying an original BLE packet 801 to a receiver such as receiver 102. The receiver 102 may receive the packet 811 and perform a CRC to determine whether the packet 811 is a correctly received packet of the original packet 801 without bit errors. In one embodiment, the packet 811 may be a corrupted packet including one or more bit errors such as a bit error 8111. Thus, CRC at the receive 102 will fail. The receiver 102 may generate an accumulated packet 812 and a majority decision packet (MDP) 813 based on the packet 811. When the receiver 102 only receives the packet 811, the accumulated packet 812 and the MDP 813 may be the same as the received packet 811.

Because the packet 811 is a corrupted packet of the original packet 801, the receiver 102 may request the transmitter 101 to retransmit the original packet 801. The receiver 102 may receive a retransmitted packet 821 of the original packet 801. The receiver 102 may perform a CRC to determine whether the received retransmitted packet 821 is correct. The received retransmitted packet 821 may be a corrupted packet including one or more bit errors such as a bit error 8211. The receiver 102 may generate an accumulated packet 822 including soft bits based on the packet 811 and the retransmitted packet 821.

In one aspect, the receiver 102 may generate the accumulated packet 822 by performing bitwise decimal addition on the corrupted packet 811 and the received retransmitted packet 821 to generate soft bits in the accumulated packet 822. For example, as shown in FIG. 8, the packet 811 may include a bit stream "0 1 1 0 1 0 0 0 1 0 1 1 0 1 1," and at the corresponding bit locations, the retransmitted packet 821 may include a bit stream "0 1 1 0 0 0 0 1 0 1 1 0 0 1." The receiver 102 may add the bit in the packet 811 and the corresponding bit in the retransmitted packet 821 to generate the accumulated packet 822 to include a soft bit stream "0 2 2 0 1 0 0 0 2 0 2 2 0 1 2," as shown in FIG. 8. In this example, the bit 8112 in the packet 811 is 1 and the bit 8212 at the corresponding bit location in the retransmitted packet 821 is also 1, thus, the soft bit 8221 at the corresponding bit location in the accumulated packet 822 has a value of 2 (i.e., 1+1). In one aspect, the receiver 102 may compare the corrupted packet 811 and the received retransmitted packet 821 to identify bit locations with different bit values. The identified bit locations may indicate possible bit errors.

In one aspect, the receiver 102 may generate a MDP 823 based on the accumulated packet 822. The MDP 823 may be used as a guess of the original packet 801. Each of the soft bits in the accumulated packet 822 may indicate a confidence level of a corresponding bit in the MDP 823. For example, in the first transmission, bit 8112 is 1 and in the second transmission (the first retransmission), bit 8212 at that bit location is also 1. Thus, it has a higher probability that the correct bit at that bit location is 1 instead of 0 because in two transmissions (one original transmission and one retransmission) the bit values at that bit location are the same. Therefore, the soft bit 8221 having a value of 2 may indicate that it has a higher confidence level that the correct bit at that bit location is 1. Accordingly, the receiver 102 may determine that, in the MDP 823, the bit 8231 (a guess of the correct bit) at that bit location is 1.

On the other hand, in the first transmission, bit 8113 is 1 and in the second transmission (the first retransmission), bit 8211 at that bit location is 0. Thus, at that bit location, it is not sure whether the correct bit at that location is 1 or 0 because in two transmissions the bit values at that bit location are different. Therefore, the soft bit 8222 having a value of 1 may indicate that the receiver 102 may be not sure whether the correct bit at that location is 1 or 0. Accordingly, the receiver 102 may determine that, in the MDP 823, the bit 8232 (a guess of the correct bit) at that bit location may be either 1 or 0, as indicated by "?". The receiver 102 may set the bit 8232 in the MDP 823 as either 1 or 0 as a guess of that bit.

In one aspect, the receiver 102 may request more than one retransmissions of the original packet 801 to collect more useful information to determine the locations of bit errors in the received corrupted packets. For example, the receiver 102 may request a second retransmission of the original packet 801 and receive a retransmitted packet 831 which may include one or more bit errors. The receiver 102 may generate an accumulated packet 832 based on the packet 811, the received retransmitted packets 821 and 831. The receiver 102 may generate the accumulated packet 832 by performing bitwise decimal addition on the packet 811 and the received retransmitted packets 821 and 831, similarly as described above. For example, the bit 8311 in the packet 831 is 1, thus, the soft bit 8321 at the corresponding bit location in the accumulated packet 832 has a value of 2 (i.e., 1+0+1).

Also, the receiver 102 may generate a MDP 833 based on the accumulated packet 832, similarly as described above. The MDP 833 may be used as a guess of the original packet 801. For example, the soft bit 8321 having a value of 2 may indicate that it has a higher confidence level that the correct bit at that bit location is 1. This is because in three transmissions (one original transmission and two retransmissions), two (i.e., bits 8113 and 8311) of the three bit values at that bit location are 1. Accordingly, the receiver 102 may determine that, in the MDP 833, the bit 8331 (a guess of the correct bit) at that bit location is 1.

Similarly, the receiver 102 may request a third retransmission and receive a retransmitted packet 841 that may include one or more bit errors. The receiver 102 may generate an accumulated packet 842 based on the four received corrupted packets (811, 821, 831 and 841). Also, the receiver 102 may generate a MDP 843 based on the accumulated packet 842. The MDP 843 may be used as a best guess of the original packet 801.

In one aspect, for a number of N total transmissions (1 original transmission+(N−1) retransmissions), when N is an even number, if a value of a soft bit in an accumulated packet is higher than N/2, the corresponding bit in the generated MDP is 1; if the value of the soft bit is equal to N/2, the corresponding bit in the generated MDP can be either 1 or 0; if the value of the soft bit is less than N/2, the corresponding bit in the generated MDP is 0. For example, as shown in FIG. 8, when there are 4 total transmissions of the original packet 801, if the soft bit in the accumulated packet 842 has a value of 3 or 4, the corresponding bit in the generated MDP 843 is 1; if the soft bit in the accumulated packet 842 has a value of 2, the corresponding bit in the generated MDP 843 can be either 1 or 0 as indicated by "?"; if the soft bit in the accumulated packet 842 has a value of 0 or 1, the corresponding bit in the generated MDP 843 is 0. In another example, when N+1/2 is an odd number, if a value of a soft bit in an accumulated packet is equal or higher than, the corresponding bit in the generated MDP is 1; otherwise, the corresponding bit in the generated MDP is 0.

After the MDP is generated, the CRC is computed to determine if any errors remain. Assuming the BER is independent of bit position, the probability that a bit-error falls in the same location is exceedingly small and decreases with each retransmission. Hence, the ability to resolve errors increases with increasing number of retransmissions.

Figure 9:
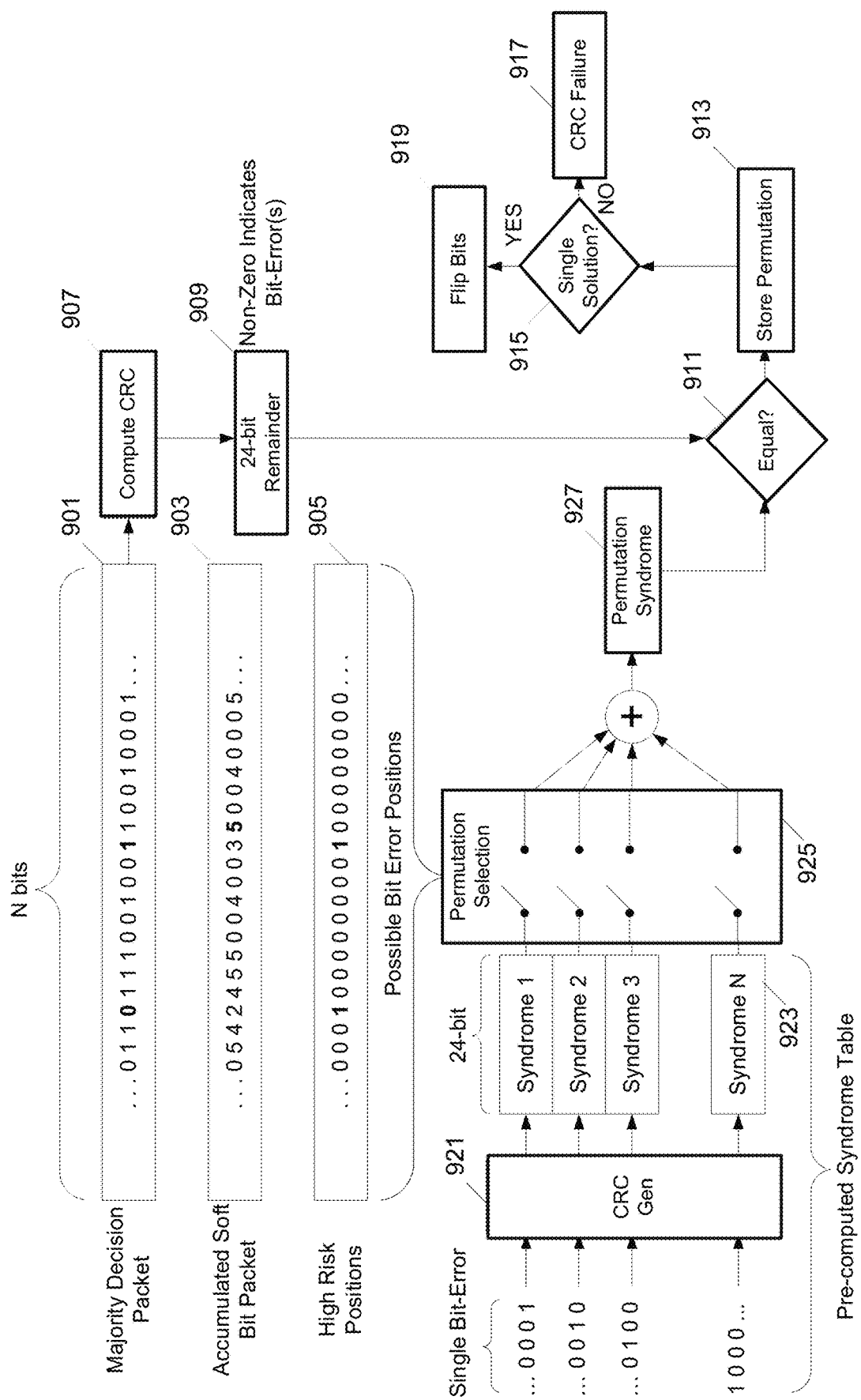
FIG. 9 illustrate an example CRC-EC technique that operates on an accumulated soft bit packet from the RE-BEC technique to permutate through possible bit error positions to correct bit errors, in accordance with some embodiments of the present disclosure.

FIG. 9 illustrate an example CRC-EC technique that operates on an accumulated soft bit packet from the RE-BEC technique to permutate through possible bit error positions to correct bit errors, in accordance with some embodiments of the present disclosure. In the case that the CRC check fails after RE-BEC, the CRC-EC technique is invoked as shown in block 415 of FIG. 4. CRC-EC is a low complexity algorithm that permutates through possible bit error positions and checks the CRC result to identify the error free combination.

As illustrated in FIG. 9, at block 907, the 24-bit non-zero CRC checksum 909 from the RE-BEC created MDP 901 is obtained as reference. The high risk or most likely bit-error positions 905 are identified from the accumulated soft bit packet (ASBP) 903 from RE-BEC. If ASBP(i) is the $i^{th}$ bit of ASBP, and T is the total number of transmissions accumulated into ASBP, then $$ASBP(i)=\text{Likely Error } IF\ T-1/2-S \le ASBP(i) \le T+1/2+S$$

where S is a sensitivity parameter and may be set according to T and the maximum error position capacity configured for CRC-EC. In one aspect, S=0, and the maximum number of error positions considered in CRC-EC is 10.

Once the possible bit error positions 905 are identified, the corresponding precomputed single-bit error syndromes are extracted. All combinations are then permutated through and the permutation syndrome 927 compared to the non-zero CRC remainder 909 generated from the MDP 901. To further reduce complexity, a Gray table may be used to order the permutations, thus requiring only a single XOR operation to obtain the next permutation syndrome 927 for comparison. The size of the Gray Code table may be 2^(Max Positions)−1 where Max Positions is currently set to 10 for a total size of 1023 bytes. A setting of 10 for Max Positions is a balanced compromise between complexity and performance.

For BLE, the total maximum bytes covered by the CRC including the CRC itself is 260 bytes or 2080 bits. To perform CRC-EC, the CRC syndrome 923 for each individual bit is required, which for the 3-byte CRC requires a 6240-byte table. The table required for packets that are less than the maximum length is a subset of the maximum table. Hence, this maximum table is all that is required to support all possible packet sizes. The syndrome table 921 for all 2080 bits may be precomputed. The CRC-EC technique may use the single bit-error positions 905 of each permutation of possible bit-error positions to address the syndrome 921 to extract the corresponding single-bit error syndromes 923. The single-bit error syndrome 923 may be selected by block 925 based on the particular permutation of possible bit-error positions to be XOR'ed to generate the permutation syndrome 927.

At block 911, if the permutation syndrome matches the non-zero CRC remainder 909 generated from the MDP 901, the corresponding permutation of possible bit-error positions may be stored at block 913 to reconstruct an error-free payload. Otherwise, if there is no match, the CRC-EC may compute the permutation syndrome for the next permutation of possible bit-error positions. At block 915, after computing the permutation syndromes for all permutations the CRC-EC technique may verify if a match is found for only a single permutation. If this condition is true, at block 919, the bits in the MDP 901 corresponding to this permutation of possible bit-error positions are flipped to reconstruct an error-free payload. Otherwise, if there is no single permutation solution, the CRC-EC technique fails to correct the bit errors and CRC failure is declared at block 917.

Figure 10:
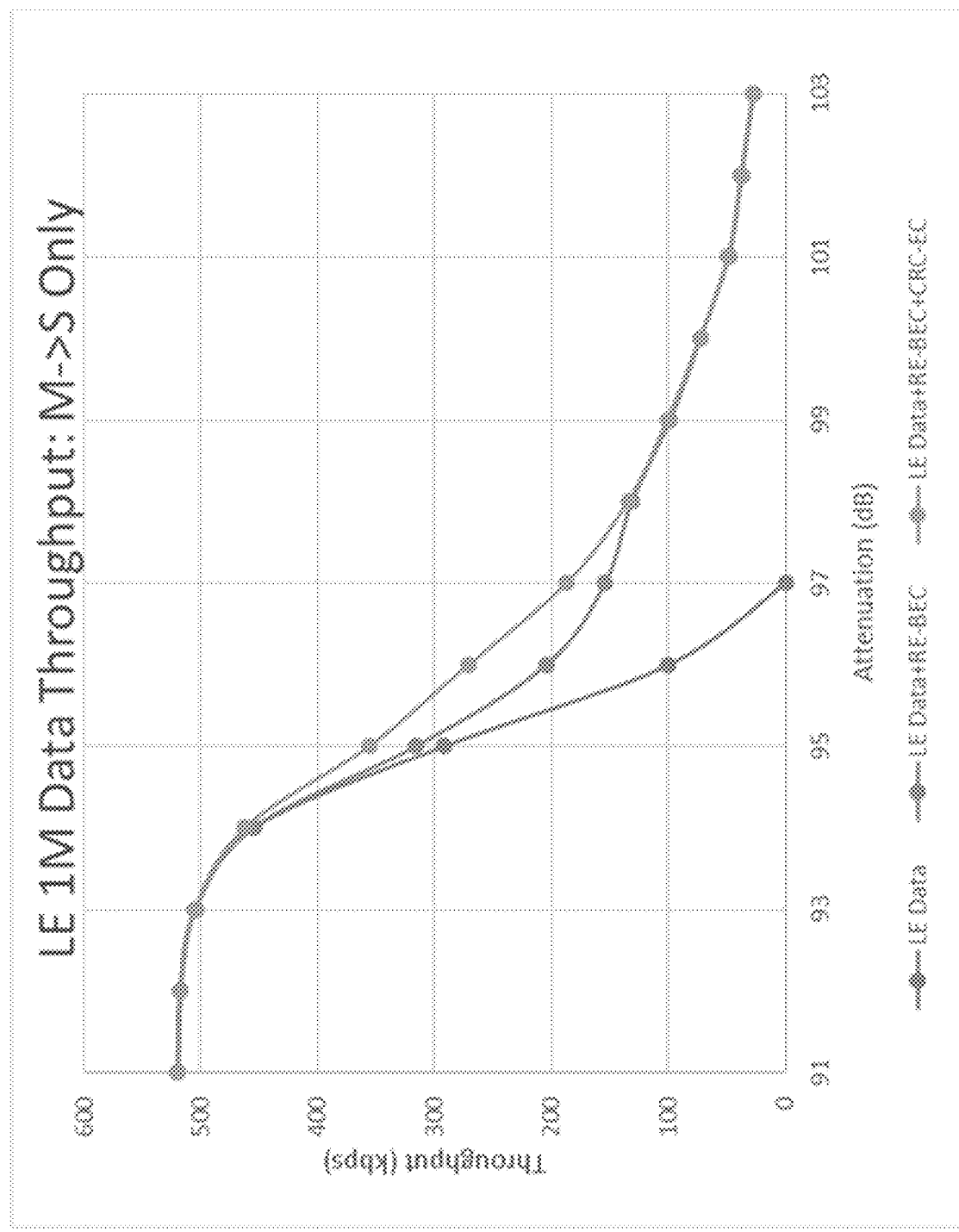
FIG. 10 illustrates the throughput improvement of a 1 Mbps BLE link using header processing to reduce the header error rate and the RE-BEC and CRC-EC techniques on corrupted packets to correct bit errors, in accordance with some embodiments of the present disclosure.

FIG. 10 illustrates the throughput improvement of a 1 Mbps BLE link using header processing to reduce the header error rate and the RE-BEC and CRC-EC techniques on corrupted packets to correct bit errors, in accordance with some embodiments of the present disclosure.

As shown, the LE data link drop is at 97 dB attenuation or BER=0.00226 (0.226%). The link drop point is extended past to 103 dB or BER=0.0343 (3.43%) using the techniques described, an improvement of at least 6 dB. The RE-BEC throughput drops to ⅓ quickly and then levels off because it needs a total of 3 transmissions before it be effective. The addition of CRC-EC saves 1 transmission up to 97 dB attenuation, providing significant throughput improvement in this transition area. However, beyond this points, no additional improvement is seen because the total number of unreliable bit positions begins to exceed the capability of the model.

Figure 11:
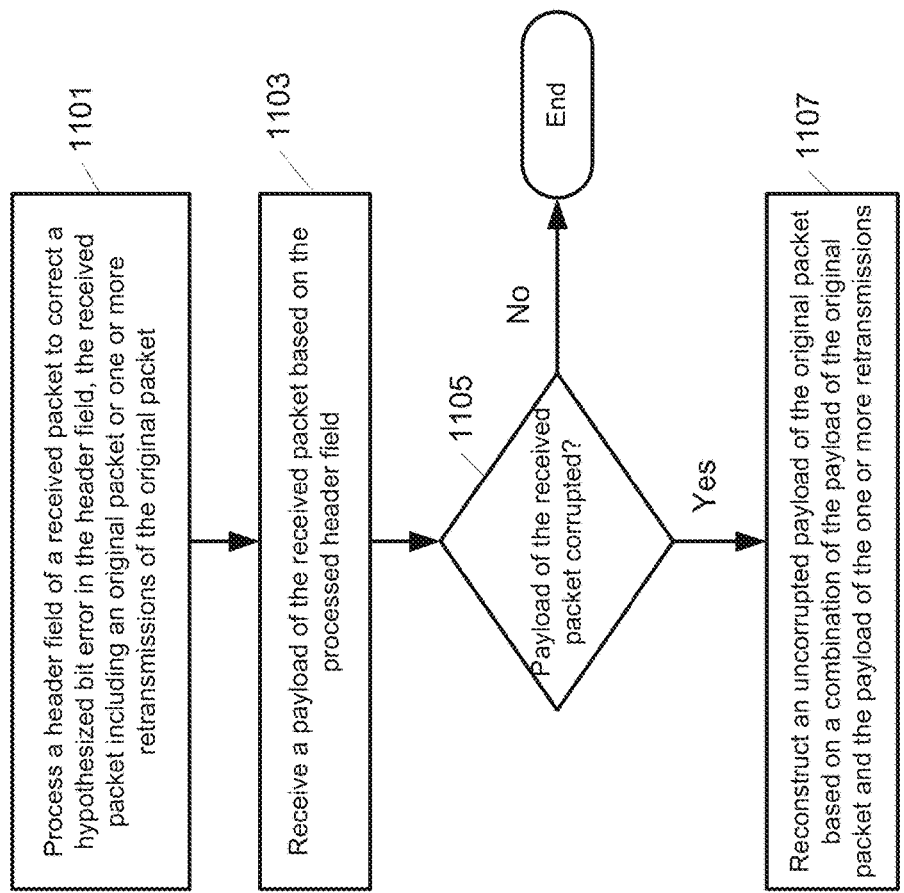
FIG. 11 illustrate a flow diagram of a method to process the access address and the length field of a corrupted BLE packet to increase the number of corrupted packets available for packet reconstruction, and to reconstruct the packet using the RE-BEC and CRC-EC techniques, in accordance with some embodiments of the present disclosure.

FIG. 11 illustrate a flow diagram of a method 1100 to process the access address and the length field of a corrupted BLE packet to increase the number of corrupted packets available for packet reconstruction, and to reconstruct the packet using the RE-BEC and CRC-EC techniques, in accordance with some embodiments of the present disclosure. Method 1100 may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by the receiver 102, or a processing device included in the receiver 102 (e.g., processing device 1211 illustrated in FIG. 12).

At block 1101, the method 1100 processes a header field of a received packet to correct a hypothesized bit error in the header field. The received packet may include an original packet or one or more retransmissions of the original packet.

At block 1103, the method 1100 receives a payload of the received packet based on the processed header field of the received packet.

At block 1105, the method 1100 determines if the payload of the received packet is corrupted.

At block 1107, the method 1100 reconstructs an uncorrupted payload of the original packet based on a combination of the payload of the original packet and the payload of the one or more retransmissions if the payload of the received packet is corrupted.

Figure 12:
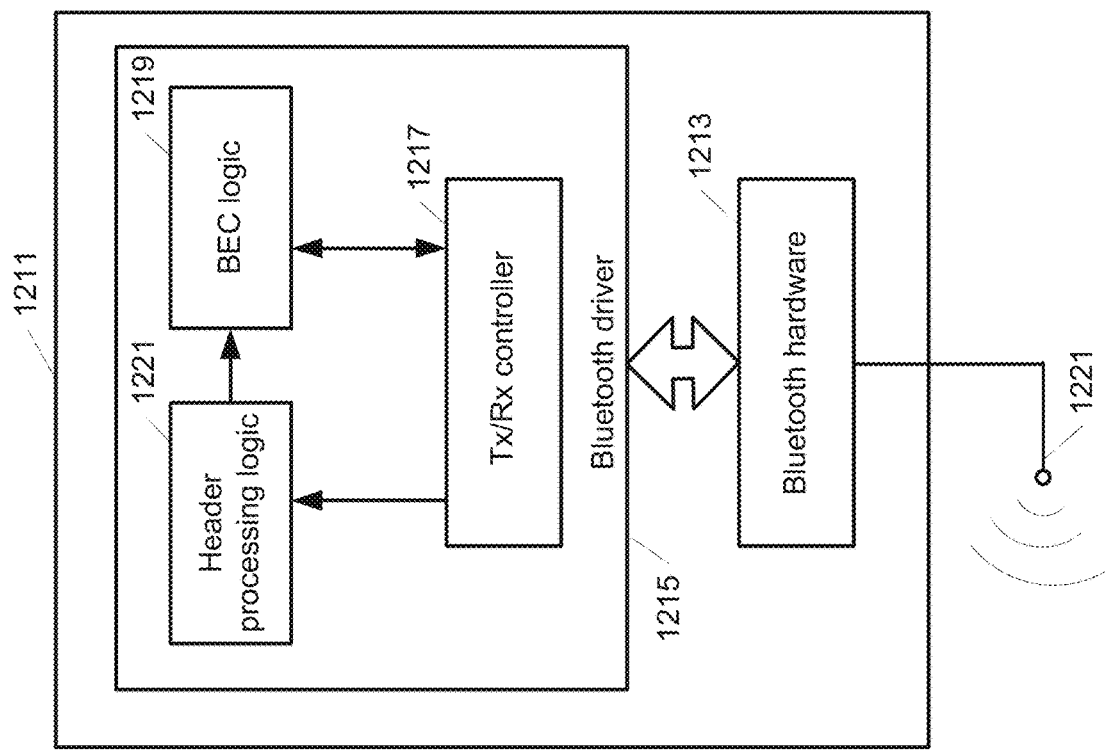
FIG. 12 is a block diagram of a Bluetooth device showing hardware and software drivers deployed to operate in a Bluetooth link aided by the header decoding and bit error correction techniques, in accordance with some embodiments of the present disclosure.

FIG. 12 is a block diagram of a Bluetooth device 1211 showing hardware and software drivers deployed to operate in a Bluetooth link aided by the header decoding and bit error correction techniques, in accordance with some embodiments of the present disclosure. The Bluetooth device 1211 may be the receiver 102 and may practice the operations of methods 4, 6, 7, and 11.

The Bluetooth device 1211 may include one or more antennas 1221, Bluetooth hardware 1213 and Bluetooth driver 1215. The Bluetooth driver 1215 may include Bluetooth Tx/RX controller 1217, header processing logic 1221, and BEC logic 1219. The Bluetooth hardware 1213 may be configured to transmit or receive BLE packets on an operating channel through the antennas 1221.

The Bluetooth Tx/Rx controller 1217 may be configured to demodulate and decode received BLE packets and to encode and modulate BLE packets for transmission. The header processing logic 1221 may be configured to process the header such as the access address and the length field of the BLE packet to reduce the header error rate and to increase the number of corrupted BLE packets available for payload reconstruction by the BEC logic 1210. The BEC logic 1210 may be configured to implement the RE-BEC and CRC-EC techniques to correct bit errors in the payload of corrupted BLE packets.

In one embodiment, the Bluetooth device 1211 may include a memory and a processing device. The memory may be synchronous dynamic random access memory (DRAM), read-only memory (ROM)), or other types of memory, which may be configured to store the code to perform the function of the Bluetooth driver 1215. The processing device may be provided by one or more general-purpose processing devices such as a microprocessor, central processing unit, or the like. In an illustrative example, processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

Unless specifically stated otherwise, terms such as "receiving," "generating," "verifying," "performing," "correcting," "identifying," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   generating a corrected header field of a received packet based on a header field of a previous packet that was correctly received, the received packet comprising an original packet or a retransmission of the original packet;
   receiving a payload of the received packet based on the corrected header field; and
   determining if the received packet including the corrected header field and the payload is correctly received or is corrupted.

2. The method of claim 1, wherein the header field of the received packet comprises a length field indicating a length of the payload of the received packet, and wherein the payload follows the header field in the received packet.

3. The method of claim 1, wherein generating the corrected header field comprises:
   determining a reliability measure of a channel over which the packet is received; and
   correcting the header field to generate the corrected header field or leaving unchanged the header field based on the reliability measure of the channel.

4. The method of claim 3, wherein the reliability measure of the channel is determined based on statistics of corrupted payloads of a plurality of packets received over the channel or a number of retransmissions taken to receive uncorrupted payloads of the plurality of packets.

5. The method of claim 3, wherein correcting the header field or leaving unchanged the header field based on the reliability measure of the channel comprises:
   accepting the header field as received if the reliability measure indicates the channel is reliable and if the header field is not more than a maximum allowed length;
   assigning the corrected header field of the received packet as the header field of the previous packet that was correctly received when the header field of the received packet differs by one bit or less from the header field of the previous packet that was correctly received and if the reliability measure indicates the channel is unreliable; or
   accepting the header field as received when the header field of the received packet differs by more than one bit from the header field of the previous packet that was correctly received and if the reliability measure indicates the channel is unreliable and if the header field is not more than the maximum allowed length.

6. The method of claim 5, further comprising:
   requesting a retransmission of the packet in response to determining that the received packet is corrupted when the corrected header field of the received packet was assigned as the header field of the previous packet that was correctly received.

7. The method of claim 5, further comprising:
   updating the header field of the previous packet that was correctly received by to be the corrected header field of the received packet or the header field as received in response to determining that the received packet is correctly received.

8. The method of claim 1, further comprising:
   reconstructing an uncorrupted payload of the original packet based on a combination of the payload of the original packet and the payload of one or more retransmissions in response to determining that the payload of the received packet is corrupted.

9. The method of claim 8, wherein reconstructing an uncorrupted payload of the original packet comprises:
   generating an accumulated payload based on the payload of the original packet and the payload of the one or more retransmissions, the accumulated payload accumulating identical bits of the payload of the original packet and the payload of the one or more retransmissions;
   generating a majority decision of the uncorrupted payload based on the accumulated payload; and
   verifying that the received packet including the corrected header field and the majority decision of the uncorrupted payload is correctly received.

10. The method of claim 9, wherein verifying that the received packet including the corrected header field and the majority decision of the uncorrupted payload is correctly received comprises:
    determining that the majority decision of the uncorrupted payload has at least one error bit;
    identifying hypothesized bit error positions based on the accumulated payload;
    generating a plurality of permutations of the identified hypothesized bit error positions;
    generating a plurality of error syndromes corresponding to the plurality of permutations of the identified hypothesized bit error positions; and
    reconstructing the uncorrupted payload based on comparing the plurality of error syndromes with an error syndrome associated with the majority decision of the uncorrupted payload.

11. A receiver, comprising:
    a wireless interface configured to receive one or more packets over a channel, each of the packets containing a header field followed by a payload; and
    a processing device configured to:

determine whether to modify the header field of a received packet based on a header field of a previous packet that was correctly received, the received packet comprising an original packet or a retransmission of the original packet;

generate a corrected header field of the received packet based on the header field of the previous packet that was correctly received in response to determining to modify the header field of the received packet;

receive the payload of the received packet based on the corrected header field if the header field is modified or based on the header field of the received packet if the header field is not modified; and determine if the received packet is correctly received.

12. The receiver of claim 11, wherein the header field comprises a length field indicating a length of the payload of the received packet.

13. The receiver of claim 11, wherein to determine whether to modify the header field of the received packet, the processing device is configured to:

determine a reliability measure of the channel;

determine to generate the corrected header field of the received packet when the reliability measure indicates that the channel is unreliable and the header field of the received packet differs by one bit or less from the header field of the previous packet that was correctly received; and determine, otherwise, to keep the header field of the received packet unmodified if the header field is not more than a maximum allowed length.

14. The receiver of claim 13, wherein the reliability measure of the channel is determined based on statistics of corrupted payloads of a plurality of packets received over the channel or a number of retransmissions taken to receive uncorrupted payloads of the plurality of packets.

15. The receiver of claim 11, wherein to generate the corrected header field, the processing device is configured to:

assign the corrected header field of the received packet as the header field of the previous packet that was correctly received.

16. The receiver of claim 11, wherein the processing device is further configured to:

request a retransmission of the packet in response to determining that the received packet is corrupted and the payload of the packet is received based on the corrected header field.

17. The receiver of claim 11, wherein the processing device is further configured to:

in response to determining that the received packet is correctly received, update the header field of the previous packet that was correctly received to be the corrected header field of the received packet if the header field is modified, or to be the header field of the received packet if the header field is not modified.

18. The receiver of claim 11, wherein the processing device is further configured to:

reconstruct an uncorrupted payload of the original packet based on a combination of the payload of the original packet and the payload of one or more retransmissions in response to determining that the received packet is corrupted.

19. The receiver of claim 11, wherein to determine if the received packet is correctly received, the processing device is configured to:

determine if the payload of the received packet and the corrected header field if the header field is modified or the header field of the received packet if the header field is not modified passes a cyclic redundancy check (CRC).

20. A communication device, comprising:

one or more antennas;

a receiver coupled to the one or more antennas to receive one or more packets, each of the packets containing a header field followed by a payload; and a processing device coupled to the receiver, the processing device configured to:

determine whether to modify the header field of a received packet based on a header field of a previous packet that was correctly received, the received packet comprising an original packet or a retransmission of the original packet;

generate a corrected header field of the received packet based on the header field of the previous packet that was correctly received in response to determining to modify the header field of the received packet;

receive the payload of the received packet based on the corrected header field if the header field is modified or based on the header field of the received packet if the header field is not modified; and determine if the received packet is correctly received.

* * * * *